US011169042B1

(12) United States Patent
Riou et al.

(10) Patent No.: US 11,169,042 B1
(45) Date of Patent: Nov. 9, 2021

(54) ENCASED PRESSURE SENSOR FOR MEASURING PRESSURE IN AN AIRCRAFT WHEEL

(71) Applicants: Safran Electronics & Defense, Paris (FR); Compagnie Generale Des Etablissements Michelin, Clermont-Ferrand (FR); Safran Landing Systems, Velizy-Villacoublay (FR); Safran, Paris (FR)

(72) Inventors: Jean-Christophe Riou, Paris (FR); Eric Bailly, Paris (FR)

(73) Assignees: SAFRAN ELECTRONICS & DEFENSE, Paris (FR); COMPAGNIE GENERALE DES ETABLISSEMENTS MICHELIN, Clermont-Ferrand (FR); SAFRAN, Paris (FR); SAFRAN LANDING SYSTEMS, Velizy-Villacoublay (FR)

( * ) Notice: Subject to any disclaimer, the term of this patent is extended or adjusted under 35 U.S.C. 154(b) by 0 days.

(21) Appl. No.: 17/271,884

(22) PCT Filed: Aug. 27, 2019

(86) PCT No.: PCT/EP2019/072890
§ 371 (c)(1),
(2) Date: Apr. 13, 2021

(87) PCT Pub. No.: WO2020/043744
PCT Pub. Date: Mar. 5, 2020

(30) Foreign Application Priority Data

Aug. 31, 2018 (FR) ..................................... 18 57877

(51) Int. Cl.
*G01L 17/00* (2006.01)
*B60C 23/04* (2006.01)
(Continued)

(52) U.S. Cl.
CPC .......... *G01L 17/00* (2013.01); *B60C 23/0411* (2013.01); *B60C 23/0493* (2013.01);
(Continued)

(58) Field of Classification Search
None
See application file for complete search history.

(56) References Cited

U.S. PATENT DOCUMENTS 9,908,374 B2 * 3/2018 Dussinger ............... B60C 23/04
2008/0110250 A1 * 5/2008 Jones .................... G01M 17/02
73/146

(Continued)

FOREIGN PATENT DOCUMENTS

CN 107543649 A 1/2018
WO WO-2016/204389 A1 12/2016

*Primary Examiner* — Andre J Allen
*Assistant Examiner* — Jermaine L Jenkins
(74) *Attorney, Agent, or Firm* — Muncy, Geissler, Olds & Lowe, P.C.

(57) ABSTRACT

A pressure measurement device (1) comprising a housing (20) extending around an electronic card (30) provided with a pressure sensor (40);

the housing (20) co-operating with a first face (31) of the electronic card (30) to define a first sealed volume (3);

the housing (20) also co-operating with a second face (32) of the electronic card (30) that is opposite from the first face (31) to define a second sealed volume (4);

the housing (20) including at least one first channel (24) putting the medium (5) outside the housing (20) into fluid flow communication with the first sealed volume (3);

the electronic card (30) including at least one second channel (33) putting the first volume (3) into fluid flow communication with the second volume (4); and (Continued)

the connection between the housing (20) and the electronic card (30) being arranged to allow relative movement between the housing (20) and the electronic card.

14 Claims, 5 Drawing Sheets

(51) Int. Cl.
*G01L 19/06* (2006.01)
*G01L 19/04* (2006.01)
*G01L 19/14* (2006.01)

(52) U.S. Cl.
CPC .......... *G01L 19/04* (2013.01); *G01L 19/0636* (2013.01); *G01L 19/0654* (2013.01); *G01L 19/148* (2013.01)

(56) References Cited

U.S. PATENT DOCUMENTS

2013/0055821 A1 3/2013 Bentley et al.
2017/0158001 A1 6/2017 Li et al.
2021/0101423 A1* 4/2021 Bill .................... B60C 23/0479

* cited by examiner 30
36.1
30.1
20
36
1

30
30.1
36.1
20
1

ENCASED PRESSURE SENSOR FOR MEASURING PRESSURE IN AN AIRCRAFT WHEEL

FIELD OF THE INVENTION

The present invention relates to measuring pressure, and more particularly to measuring pressure in an aircraft wheel.

BACKGROUND OF THE INVENTION

Conventionally, an aircraft wheel comprises a cylindrical rim carrying a tire that co-operates with the rim to define an inside volume filled with a fluid under pressure, generally air or a fluid comprising a majority of nitrogen together with various components of air. After each landing, the pressure of the air contained in the wheel is measured by using a pressure measurement device mounted on an inflation valve secured to the rim. The rim generally contains a stack of brake disks called a heat pack that gives off a significant amount of heat when braking the aircraft (temperatures higher than 500 degrees Celsius). This heat requires the use of specific materials and assembly techniques, which make the manufacture of such a pressure sensor very expensive. Furthermore, the exposure of the sensor to high temperature while taking a measurement disturbs the accuracy of the measurement.

OBJECT OF THE INVENTION

The object of the invention is to improve the accuracy of a pressure measurement device.

SUMMARY OF THE INVENTION

To this end, the invention provides a pressure measurement device comprising a housing extending around an electronic card provided with a pressure sensor. The housing co-operates with a first face of the electronic card to define a first sealed volume. The housing also co-operates with a second face of the electronic card that is opposite from the first face to define a second sealed volume. The housing includes at least one first channel putting the medium outside the housing into fluid flow communication with the first sealed volume. The electronic card includes at least one second channel putting the first volume into fluid flow communication with the second volume. The connection between the housing and the electronic card is arranged to allow relative movement between the housing and the electronic card.

A pressure measurement device is thus obtained that provides effective mechanical decoupling and that also performs double filtering of the particles contained in the fluid that is having its pressure measured. The succession of channels through which the fluid passes in order to reach the sensor also limits the effects of pressure and temperature transients. The housing also improves protection against mechanical aggression. It is thus possible to select a pressure sensor that is more accurate than sensors of the prior art, where selection has been based essentially on constraints associated with effectively withstanding aggression from the medium in which the device is placed.

Advantageously, the pressure sensor extends in the first sealed volume.

The filtering of the fluid that is having its pressure measured is improved when the pressure sensor defines a sealed measurement enclosure, and when said sealed measurement enclosure is in fluid flow communication with the second volume.

Also advantageously, the measurement device includes processor means for processing the signal from the sensor and/or communication means extending in the first sealed volume. It should be observed that in this sensor, the electronic assembly, the sensing element, and the support receiving the electronic components are all under pressure while being protected by a thin layer of Parylene having a thickness of 10 micrometers (μm).

In a preferred embodiment, a portion of the electronic card extends outside the housing.

The filtering of temperature and pressure transients, and also the filtering of the particles present in the fluid that is having its pressure measured is particularly effective when the first channel is circular in section with a first diameter lying in the range 0.2 millimeters (mm) to 1.5 mm, preferably being 1 mm, and the second channel is circular in section with a second diameter lying in the range 100 μm to 300 μm, preferably being 200 μm.

The second channel is provided with good protection when it is metal plated.

The sensor is provided with improved protection against freezing when a conductive element is placed in the proximity of the second channel and is connected to a first pole of a voltage generator, the second channel being connected to a second pole of said voltage generator. Protection against freezing is further improved when the pressure measurement device includes a heater device for heating the at least one second channel. Such a heater device can be made inexpensively when the heater device comprises a resistive wire.

The conductive element can be made inexpensively when the conductive element comprises a zone of the first face that is provided with a conductive coating.

The robustness of the device is improved when the connection between the housing and the electronic card includes means for damping vibration. Such a connection can be made inexpensively when it is made with adhesive.

The invention also provides a tire including a pressure measurement device of the above type, a wheel provided with such a tire, and also an aircraft equipped with such a wheel.

Other characteristics and advantages of the invention appear on reading the following description of particular, nonlimiting embodiments of the invention.

BRIEF DESCRIPTION OF THE DRAWINGS

Reference is made to the accompanying figures, in which.

DETAILED DESCRIPTION OF THE INVENTION

Figure 1:
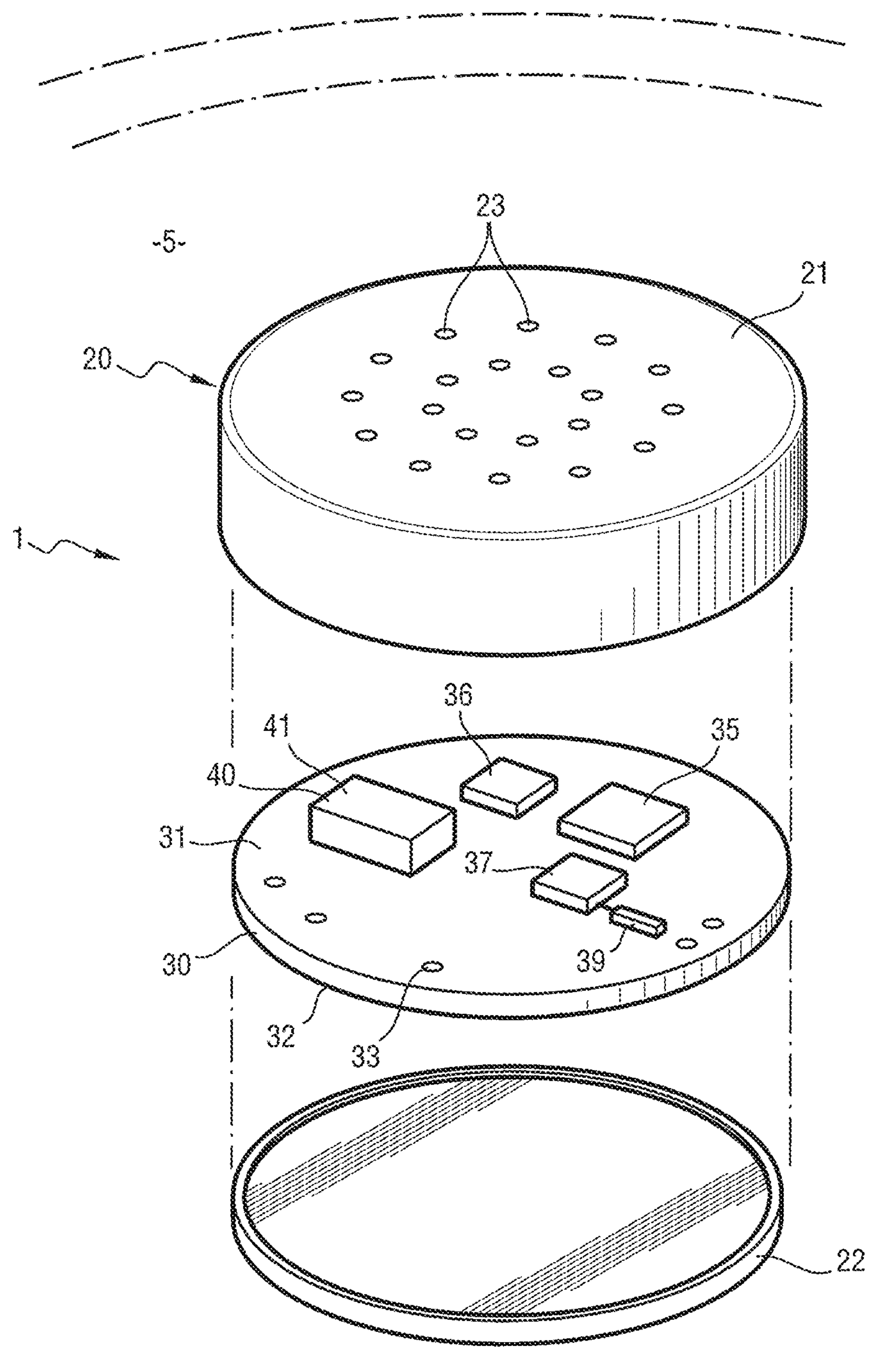
FIG. 1 is an exploded diagrammatic view in perspective of a pressure measurement device in a first embodiment of the invention.
Figure 2:
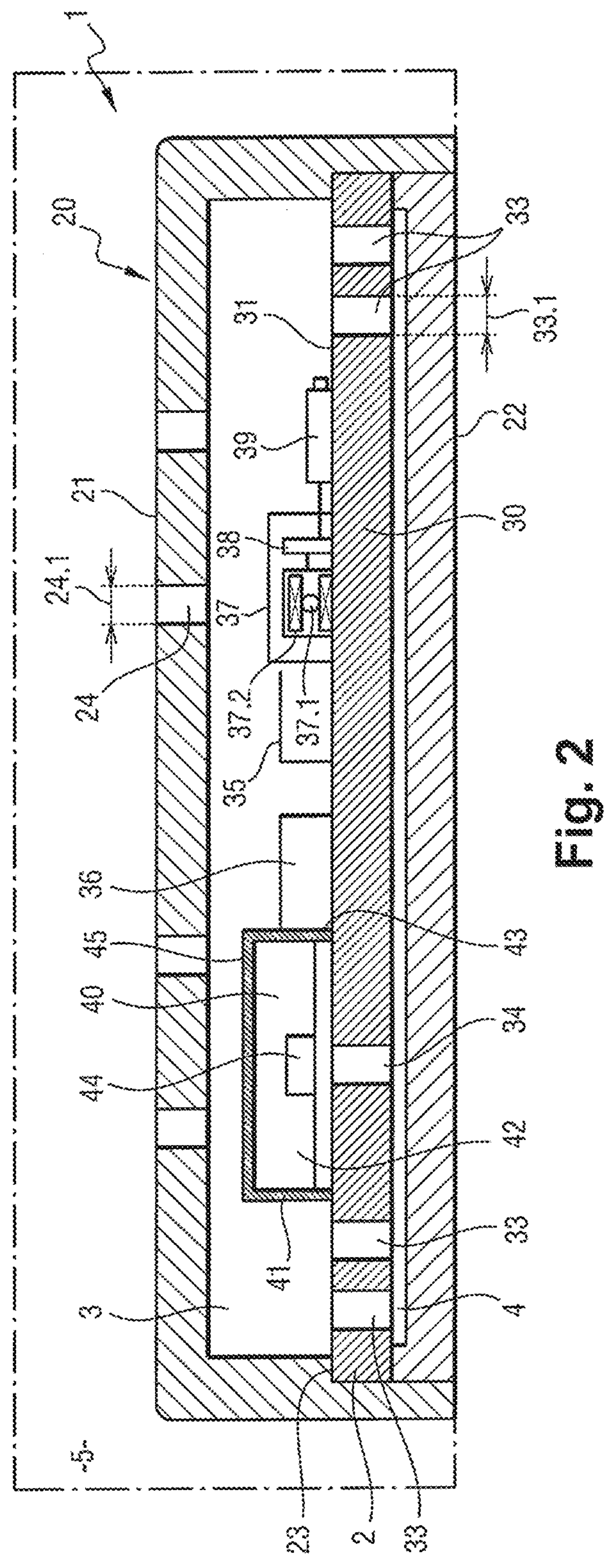
FIG. 2 is a diagrammatic section view of the FIG. 1 pressure measurement device.
Figure 3:
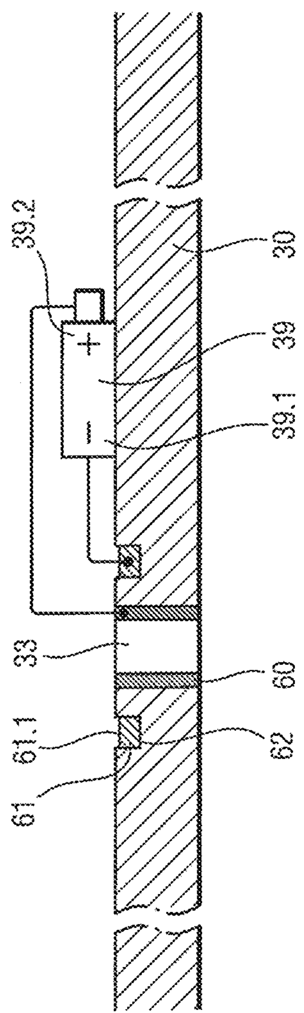
FIG. 3 is a detail view of the FIG. 1 pressure measurement device.

With reference to FIGS. 1 to 3, the pressure measurement device of the invention, given overall reference 1, comprises a housing 20 made of phenolic resin, in this example in the shape of a straight cylinder, that extends around an electronic card 30 provided with a pressure sensor 40 welded on the first face 31 of the electronic card 30. The housing 20 comprises a top cover 21 screwed on a bottom cover 22. The top cover 21 and the bottom cover 22 are arranged to form a peripheral setback 23 in which the electronic card 30 is fastened using a bead 2 of flexible silicone-based adhesive.

The top cover 21 of the housing 20 co-operates with the first face 31 of the electronic card 30 to define a first sealed volume 3. The bottom cover 22 of the housing 20 co-operates with the second face 32 of the electronic card 30 that is opposite from the first face 31 to define a second sealed volume 4. The top cover 21 includes twenty first channels 24 that put the medium 5 outside the housing 20 into fluid flow communication with the first volume 3. The first channels 24 are circular in section, having a first diameter 24.1 of 1 mm. The electronic card 30 includes twenty second channels 33 passing through it and putting the first volume 3 into fluid flow communication with the second volume 4. The second channels 33 are circular in section, having a second diameter 33.1 of 200 μm.

The pressure sensor 40 extends in the first volume 3 and includes a mechanical protection hood 41 (wirebonding) that defines a sealed measurement enclosure 42. In this example, the pressure sensor 40 is a capacitive sensor comprising a membrane 43 that extends parallel to the first face 31 and that is provided with a first electrode 44. The top portion of the hood 41 constitutes a second electrode 45 of a capacitor 46. A third channel 33 puts the enclosure 42 into fluid flow communication with the second volume 4. The third channel 34 is circular in section, having the second diameter 34.1 of 200 μm.

The device 1 includes a microcontroller 35 to which the first electrode 44 and the second electrode 46 are connected, as is a radio transceiver 36. The microcontroller 35 and the radio transceiver 36 extend in the first volume 3. The first volume 3 also contains a kinetic energy recovery unit 37 secured to the electronic card 30. The recovery unit 37 comprises a converter 38 that converts the kinetic energy it captures into electrical energy, which it sends to a first rechargeable battery 39. In this example, the energy recovery unit 37 comprises a ball 37.1 that is made of ferromagnetic material and that can move freely in the air gap of a coil 37.2. The first rechargeable battery 39 powers the microcontroller 35 and the radio transceiver 36.

As can be seen in FIG. 3, the second channels 33 are provided with metal coating 30 that is obtained by metal plating. A ring 61 extends around each second channel 33 at a nonzero distance therefrom. In this example, each ring 61 is made by depositing copper in a groove 62 machined in the electronic card 30 and is connected to a first pole 39.1 of the first rechargeable battery 39, specifically a negative pole. The coating 60 of each second channel 33 is connected to a second pole 39.2 of the first rechargeable battery 39, specifically a positive pole. Advantageously, the top surface 61.1 of the ring 61 is set back perceptibly from the first face 31 of the electronic card 30 so as to create a retention zone.

Figure 4:
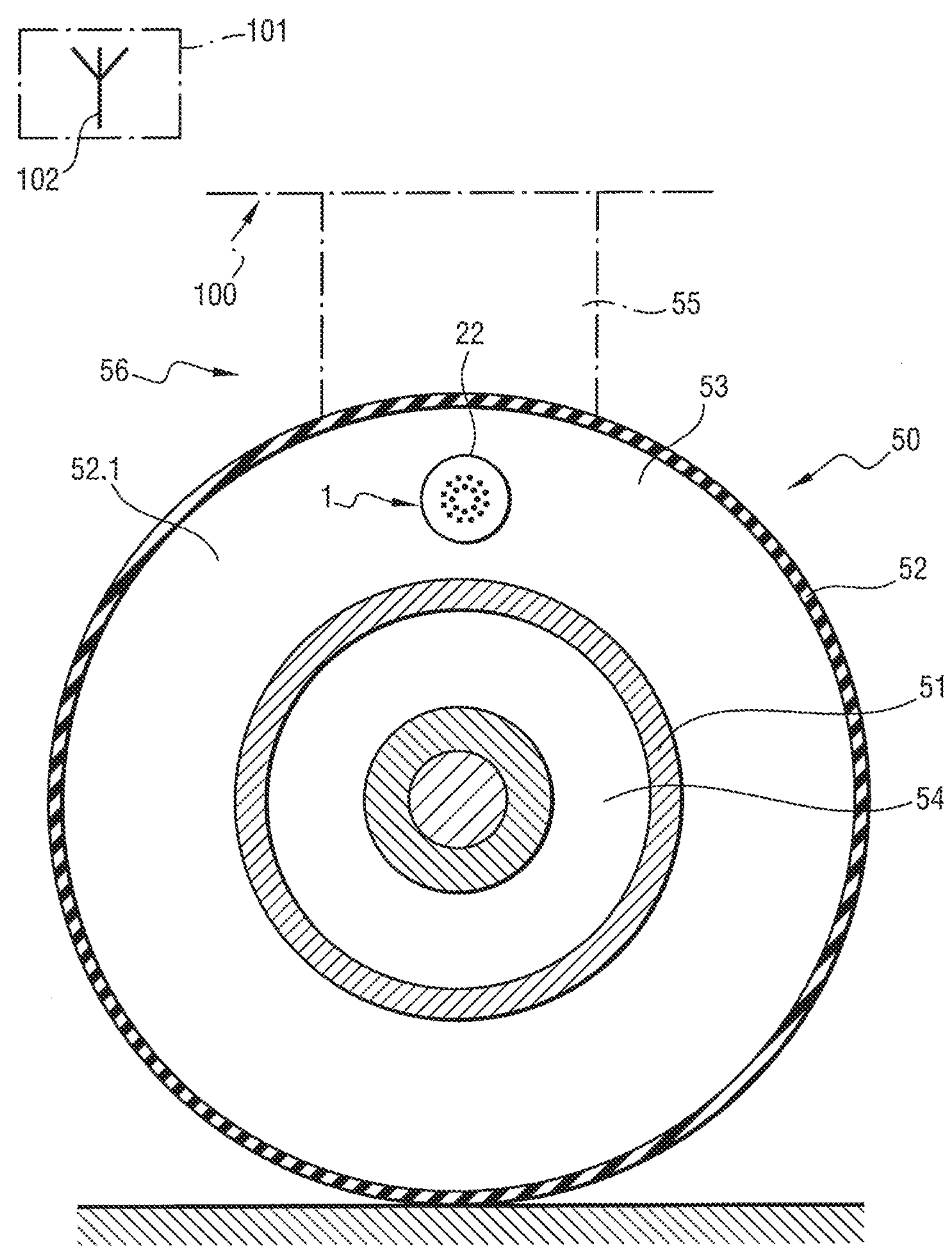
FIG. 4 is a fragmentary diagrammatic view in section of a wheel in a first embodiment of the invention.

As can be seen in FIG. 4, the pressure measurement device 1 is placed inside a wheel 50 of an aircraft 100. The wheel 50 comprises a rim 51 having a tire 52 mounted thereon. The tire 52 co-operates with the rim 51 to define an inside volume 53 of the wheel 50 that is filled with air under pressure. The bottom 22 of the pressure measurement device 1 is adhesively bonded on the inside face of a sidewall 52.1 of the tire 52. For measurement redundancy purposes, it is possible to envisage placing a plurality of pressure measurement devices 1 in a single wheel 50.

The avionics equipment 101 of the aircraft 100 includes a radio transceiver 102 tuned to the transmit/receive frequencies of the transceiver 36 of the pressure measurement device 1.

In operation, the air under pressure in the inside volume 53 penetrates into the first volume 3 via the first channels 24. The first channels 24 perform first filtering of particles (dust, filings, etc.) that might be present in the inside volume 53. Second filtering of the air under pressure in the inside volume 53 is performed by the second channels 33 when the air under pressure passes from the inside volume 53 into the second channels 33. The air present in the second volume 4 then penetrates into the enclosure 42 and acts of the membrane 43. Under the effect of the air pressure prevailing within the enclosure 42, the membrane 43 deforms, and the capacitance of the capacitor 46 is modified. The microcontroller 35 converts the capacitance of the capacitor 46 into a pressure value for the wheel 50, which value is then sent via the radio transceiver 36 to the radio transceiver 102 of the aircraft 100.

The first rechargeable battery 39 establishes a voltage between the metal coating 60 of the second channel 33 and the ring 61 that surrounds it, thereby electrolytically vaporizing any water that might be obstructing the channel 33. The diameter of the second channel 33 promotes water retention by capilarity and contributes to preventing moisture in the air contained in the inside volume 53 from penetrating as far as the second volume 4. The retention of moisture in the second channel 33 and the electrolysis device serves to limit the presence of water on the membrane 43 and to protect the device 1 from the harmful consequences of freezing while the aircraft 100 is in flight. Specifically, water ice on the sensing element of a pressure sensor generally makes it inoperative and usually causes it to be destroyed.

During periods in which the wheel 50 is rotating, the recovery unit 37 converts the kinetic energy to which the pressure measurement device 1 is being subjected into electrical energy that is stored in the first rechargeable battery 39.

The flexibility of the bead 2 of adhesive connecting together the housing 20 and the electronic card 30 allows for relative movement between the housing 20 and the electronic card 30, thereby serving to limit the transmission of vibration and of impacts from the wheel 52 the electronic card 30. The inventors have observed that the vibration, impacts, and mechanical stresses to which the electronic card 30 is subjected are reduced by a factor of at least 100 compared with the electronic card 30 being adhesively bonded directly on the side wall 52.1 of the wheel 50. The flexible adhesive generally presents hardness lying in the range 30 on the Shore OO scale to 60 on the Shore A scale.

A pressure measurement device 1 is thus obtained that provides effective mechanical decoupling and that also performs double particle filtering on the air that is having its pressure measured. The succession of channels through which the air passes in order to reach the sensor 40 also limits the effect of pressure and temperature transients. Finally, the pressure measurement device 1 possesses improved resistance to freezing.

Figure 5:
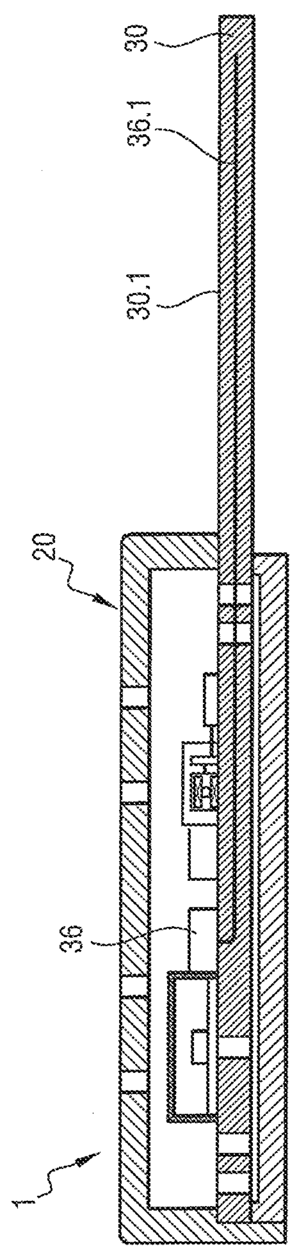
FIG. 5 is an exploded diagrammatic view in section of a pressure measurement device in a second embodiment of the invention.
Figure 6:
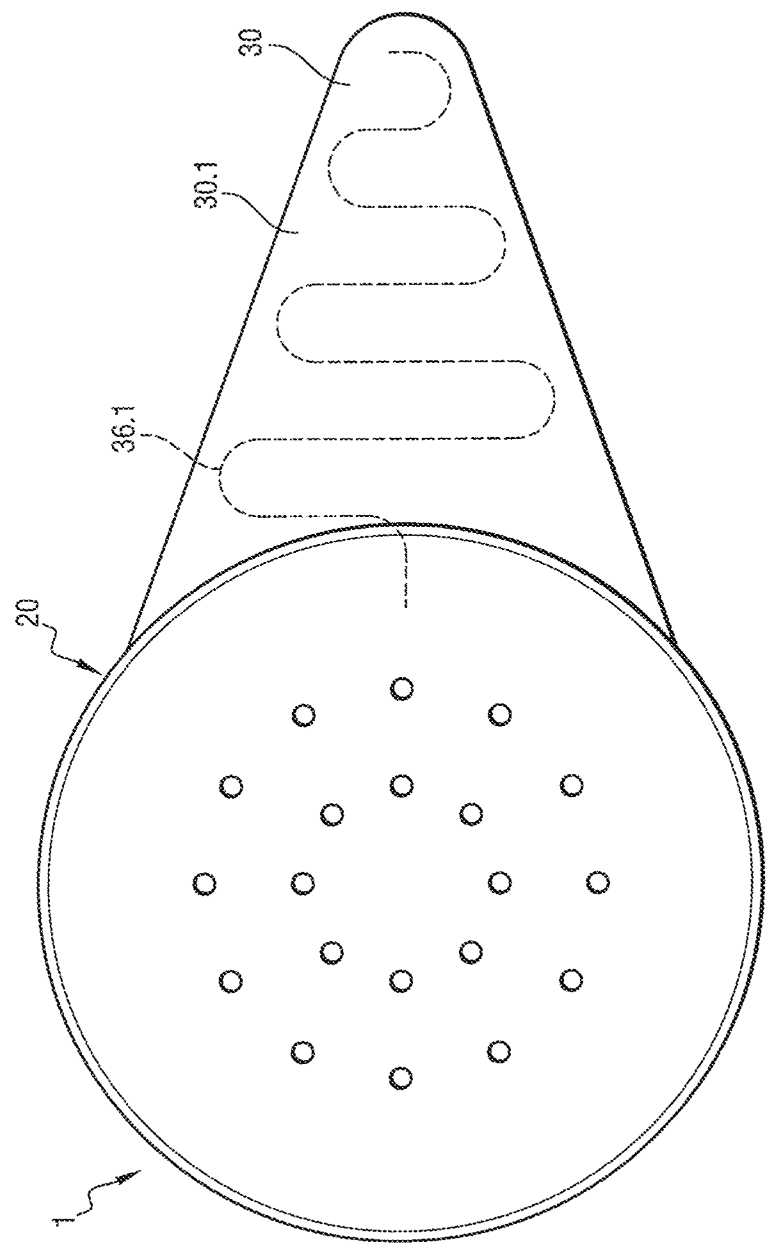
FIG. 6 is a diagrammatic plan view of the FIG. 5 pressure measurement device.

A second embodiment of the invention is shown in FIGS. 5 and 6. In this embodiment, the electronic card 30 possesses a portion 30.1, which is substantially triangular in this example, that extends outside the housing 20 and that has extending therein an antenna wire 36.1 that is connected to the radio transceiver 36.

Figure 7:
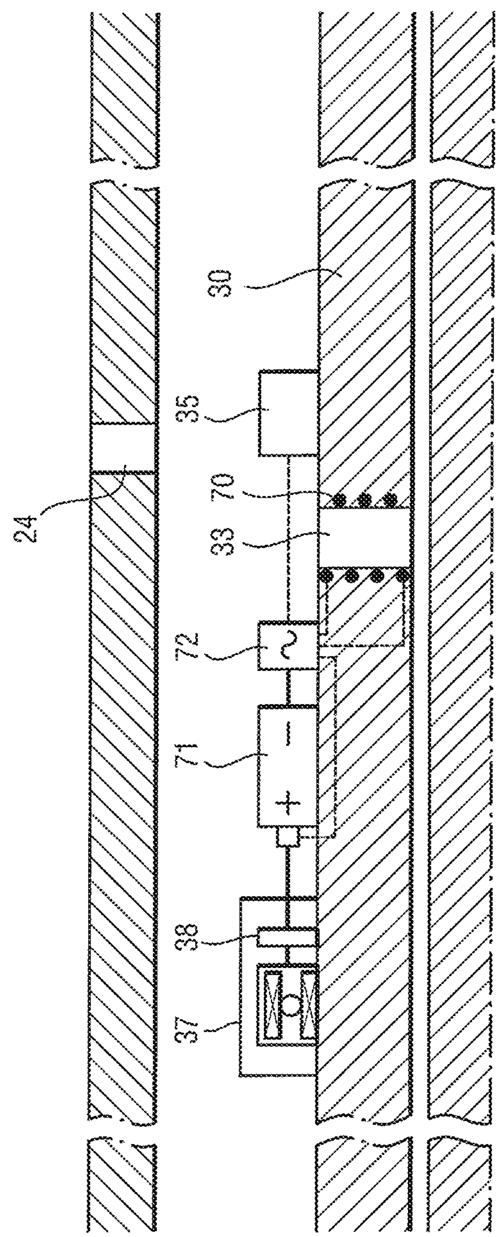
FIG. 7 is a detail view of a third embodiment of the pressure measurement device of the invention.

In a third embodiment, shown in FIG. 7, the second of channels 33 are associated with a heater device, specifically in the form of a resistor wire 70 embedded in the card 30 and spiral wound around each second channel 33. The wire 70 is connected to the poles of a second rechargeable battery 71 via a current regulator unit 72 that is controlled by the microcontroller 35. Advantageously, the second rechargeable battery 71 is connected to the converter 38. The resistor wire 70 thus serves to heat the fluid passing through the second channels 33 from the first volume 3 to the second volume 4 and to keep its temperature above the dew point. This heating thus serves to ensure that the fluid penetrating into the enclosure 42 is dry, while concentrating any zones of ice formation in the first volume 3 at the peripheries of the first channels 33 where the fluid has not been heated.

Naturally, the invention is not limited to the embodiments described, but covers any variant coming within the ambit of the invention as defined by the claims.

In particular:

- although above the pressure measurement device comprises a housing made of phenolic resin, the invention applies equally to housings of other types, e.g. such as a housing made of metal, of carbon fiber, of thermoplastic material, of composite fiber, of epoxy resin, or of other material;
- although above the housing is cylindrical in shape, the invention applies to housings of other shapes, e.g. such as a housing that is egg-shaped, or of rectangular box shape, or of any shape;
- although above the housing comprises a top cover screwed onto a bottom cover, the invention applies equally to other methods of assembling elements of the housing, e.g. such as ultrasound welding, adhesive bonding, soldering, or riveting. The housing may equally well be made up of some other number of elements, e.g. such as a single element, or more than two elements;
- although above the housing comprises a top cover and a bottom cover assembled to each other, the invention applies equally to a housing comprising two or more portions connected directly to the electronic card;
- although above the antenna is a portion of the electronic card onto which the sensor is fitted directly, the antenna could be made on the faces of the two covers and connected internally to the electronic card by means of a wire, of a braid, or of electrically conductive adhesive;
- although above the antenna is a portion of the electronic card, the antenna could be constituted by one or more metal wires that may be straight or else wound to form a spring or a spiral;
- although above the electronic card is fastened to the housing by means of a bead of flexible silicone-based adhesive, the invention applies equally to other types of bond between the housing and the electronic card that allow the housing and the electronic card to move relative to each other, e.g. such as a synthetic or natural rubber or EPDM type gasket fitted by screw fastening. Some of these materials also serve to damp the vibration to which the device is subjected, e.g. bonding with neoprene adhesive;
- although above the top cover has twenty first channels, the invention applies equally to some other number of first channels, such as for example a single channel, two to nineteen channels, or more than twenty;
- although above the first channels are circular in section with a first diameter equal to 1 mm, the invention applies equally to first channels of other section, e.g. of section that is square or arbitrary, and also to a first diameter lying in the range 0.2 mm to 1.5 mm or capable of being greater than or less than 1 mm;
- although above the electronic card has twenty second channels, the invention applies equally to some other number of second channels, e.g. such as a single channel, two to nineteen channels, or more than twenty;
- although above the second channels are circular in section with a second diameter equal to 200 μm, the invention applies equally to second channels of other section, e.g. such as a section that is square or arbitrary, and to a second diameter lying in the range 100 μm to 300 μm, or capable of being greater than or less than 200 μm;
- although above the pressure measurement device includes a microcontroller, the invention applies equally to other signal processor means, e.g. such as a field programmable gate array (FPGA), logic gates, or a microprocessor;
- although above the microcontroller and the other components are welded on an electronic card, the invention applies equally to other means for connecting components to the control circuit, e.g. such as connections via pins, by sintering, or by soldering on a printed circuit board (PCB) type support, or components connected by wires;
- although above the pressure measurement device includes a radio transceiver, the invention applies equally to wireless transmission techniques of other types, e.g. such as a 2G, 3G, 4G, or 5G protocol, or a protocol of long-range (LoRa), edge, Wi-Fi, Bluetooth, ultrasound, or Internet of things (IoT) type;
- although above the pressure measurement device includes a kinetic energy converter unit that is inductive, the invention applies equally to other types of energy converter, e.g. such as a piezoelectric type kinetic energy converter or a thermal energy converter or a device for recovering electromagnetic energy;
- although above the measurement device is placed in an aircraft wheel, the invention applies equally to wheels of other types of vehicle, e.g. such as the wheels of trucks or cars;
- although above the tire is filled with compressed air, the invention applies equally to tires filled with other types of fluid under pressure, e.g. such as gases or liquids;
- although above the pressure sensor is of capacitive type, the invention applies equally to other types of pressure sensor, e.g. such as a sensor that is resistive, inductive, piezoresistive, piezoelectric, or resonant;
- although above the components of the device are all implanted on the first face of the electronic card, the invention applies equally to the components being arranged in some other way, e.g. such as implanting some or all of the components of the device on the second face of the electronic card;
- although above the second channels are provided with a metal coating obtained by metal plating, the invention applies equally to other means for applying a metal coating in the second channels, e.g. such as crimping metal sleeves or applying conductive paint;

although above the copper ring received in a groove in the first surface of the electronic card extends around each second channel, the invention applies equally to other types of conductive element placed in the proximity of the second channel, e.g. such as a ring that is of square or arbitrary shape, metal plating on the surface of the first electronic card, or printing using a conductive ink;

although above the pressure measurement device includes a rechargeable battery, the invention applies equally to other types of voltage generator, e.g. such as a primary battery or a capacitor;

although above the conductive element is connected to a negative pole of the voltage generator and the coating of each second channel is connected to the positive pole of the voltage generator, the invention applies equally to the connection polarities being inverted;

although above the sensor is placed in a tire, the pressure measurement device may equally be used for measuring the pressure prevailing in enclosures of other types, e.g. such as in a blower or a ventilation duct;

although above the electronic card is received in a peripheral setback of the housing, the invention applies equally to other types of connection between the housing and the electronic card, e.g. such as one or more of elastomer studs extending from the first surface of the electronic card to the top cover of the housing and one or more elastomer studs extending from the second surface of the electronic card to the bottom cover of the housing;

although above the portion of the card that extends outside the housing is a rigid portion carrying an antenna, that portion of the card could equally well be flexible and/or contain conductive elements of other types associated with the components that are in the protective housing;

the pressure measurement device may equally well include a temperature sensor for transmitting its temperature and/or for performing temperature compensation of the measurement of the pressure sensor. Temperature may be measured by means of a dedicated sensor, or indeed by means of a piezoresistive sensor measuring the input resistance of the sensitive element, or by any other combination of resistances of a piezoresistive sensor that gives rise to providing an image of temperature only, with the image of pressure being eliminated from the combination in question (resistances operating longitudinally or transversely giving rise respectively to positive and negative gauge factors);

although above all of the second channels include a resistive wire, the invention applies equally to a measurement device in which only some or only one of the second channels include(s) a heater device. The heater device may also be fitted to the third channel;

although above the resistive wire is embedded in the electronic card, the invention applies equally to heater devices of other types, e.g. such as a resistive track printed on the second channel, or induction heating of the metal plating of the second channel; and although above the resistive wire is powered by a second rechargeable battery connected to a current regulator unit, the invention applies equally to other energy sources such as for example the first rechargeable battery, and to other types of control for regulating the heater device, e.g. such as servocontrol of the device using a temperature sensor.

The invention claimed is:

1. A pressure measurement device comprising a housing extending around an electronic card provided with a pressure sensor;

the housing co-operating with a first face of the electronic card to define a first sealed volume;

the housing also co-operating with a second face of the electronic card that is opposite from the first face to define a second sealed volume;

the housing including at least one first channel putting the medium outside the housing into fluid flow communication with the first sealed volume;

the electronic card including at least one second channel putting the first volume into fluid flow communication with the second volume; and the connection between the housing and the electronic card being arranged to allow relative movement between the housing and the electronic card;

wherein the second channel is metal-plated; and wherein a conductive element is placed in the proximity of the second channel and is connected to a first pole of a voltage generator, the second channel being connected to a second pole of said voltage generator.

2. The pressure measurement device according to claim 1, wherein the pressure sensor extends in the first sealed volume.

3. The pressure measurement device according to claim 1, wherein the pressure sensor defines a sealed measurement enclosure, said sealed measurement enclosure being in fluid flow communication with the second volume.

4. The pressure measurement device according to claim 1, including processor means for processing the signal from the sensor and/or communication means extending in the first sealed volume.

5. The pressure measurement device according to claim 1, wherein a portion of the electronic card extends outside the housing.

6. The pressure measurement device according to claim 1, wherein the first channel is circular in section with a first diameter lying in the range 0.2 mm to 1.5 mm, preferably being 1 mm, and the second channel is circular in section with a second diameter lying in the range 100 μm to 300 μm, preferably being 200 μm.

7. The pressure measurement device according to claim 1, wherein the conductive element comprises a zone of the first face of the electronic card that is provided with a conductive coating.

8. The pressure measurement device according to claim 1, wherein the connection between the housing and the electronic card includes means for damping vibration.

9. The pressure measurement device according to claim 1, wherein the connection between the housing and the electronic card is an adhesive connection.

10. The pressure measurement device according to claim 1, including a heater device for heating the at least one second channel.

11. The pressure measurement device according to claim 10, wherein the heater device comprises a resistive wire.

12. A tire including a pressure measurement device according to claim 1.

13. A wheel including a tire according to claim 12.

14. An aircraft including a wheel according to claim 13.

* * * * *